(12) United States Patent
McLaughlin et al.

(10) Patent No.: US 9,073,596 B2
(45) Date of Patent: Jul. 7, 2015

(54) BICYCLE SHIFTER

(75) Inventors: Scott McLaughlin, Schweinfurt (DE);
Martin Weiss, Schweinfurt (DE);
Robert Boehm, Schweinfurt (DE)

(73) Assignee: SRAM Deutschland GmbH, Schweinfurt (DE)

( * ) Notice: Subject to any disclaimer, the term of this patent is extended or adjusted under 35 U.S.C. 154(b) by 1530 days.

(21) Appl. No.: 11/161,407

(22) Filed: Aug. 2, 2005

(65) Prior Publication Data

US 2006/0053940 A1 Mar. 16, 2006

(30) Foreign Application Priority Data

Aug. 4, 2004 (DE) .......................... 10 2004 037 741

(51) Int. Cl.
*F16C 1/10* (2006.01)
*B62K 23/06* (2006.01)
*B62K 19/30* (2006.01)
*B62M 25/04* (2006.01)

(52) U.S. Cl.
CPC ............ *B62K 23/06* (2013.01); *Y10T 74/20438* (2015.01); *B62K 19/30* (2013.01); *B62M 25/04* (2013.01)

(58) Field of Classification Search
USPC .......... 74/489, 500.5, 501.6, 502.2, 519, 523, 74/525
See application file for complete search history.

(56) References Cited

U.S. PATENT DOCUMENTS

| | | | |
|---|---|---|---|
| 1,551,823 A * | 9/1925 | Guy | .............................. 74/502.2 |
| 4,046,025 A | 9/1977 | Ozaki | |
| 4,319,673 A | 3/1982 | Kojima | |
| 4,896,557 A | 1/1990 | Nagano | |
| 4,974,469 A * | 12/1990 | Romano | ...................... 74/502.2 |
| 5,832,782 A | 11/1998 | Kawakami | |
| 6,453,766 B1 | 9/2002 | Ose | |
| 2003/0167870 A1* | 9/2003 | Ose | .............................. 74/501.6 |
| 2003/0221507 A1 | 12/2003 | Wessel et al. | |

FOREIGN PATENT DOCUMENTS

| | | |
|---|---|---|
| DE | 29 40 351 A1 | 4/1980 |
| DE | 34 05 421 A1 | 8/1984 |
| DE | 102 24 196 A1 | 12/2003 |
| DE | 699 06 663 T2 | 4/2004 |
| EP | 0 698 548 A1 | 2/1996 |
| EP | 0 939 026 A2 | 9/1999 |

(Continued)

OTHER PUBLICATIONS

1987 Shimano Sales Manual, EXAGE Component specifications and assembly notes.

*Primary Examiner* — Vicky Johnson
(74) *Attorney, Agent, or Firm* — Milan Milosevic; Lisa Serolynski

(57) ABSTRACT

A bicycle shifter configured to be adjustable to accommodate a variety of sized hands. The shifter includes a housing, a cable spool for pulling and releasing a control cable, pull and cable release lever mechanisms and a clamp for mounting the shifter to a handlebar. The cable pull lever mechanism includes a cable pull lever and a driver element operatively connected to the cable spool. The release mechanism includes a cable release lever. The cable pull lever is attachable to the driver element at various orientations to vary the position of the cable pull lever relative to the cable release lever. The clamp is attachable to the shifter housing at different positions to vary the pull and cable release levers relative to the handgrip element on the handlebar.

5 Claims, 4 Drawing Sheets

(56) References Cited

FOREIGN PATENT DOCUMENTS

| | | |
|---|---|---|
| EP | 1 270 396 A2 | 1/2003 |
| GB | 207922 | 12/1923 |
| JP | 63-312291 A | 12/1988 |
| JP | 63-315390 A | 12/1988 |
| JP | 1-134591 U | 9/1989 |
| JP | 08318888 A * 12/1996 | ............... B62L 3/02 |
| JP | 2-31993 A | 2/1999 |
| JP | 2000225974 A | 8/2000 |
| JP | 8-058673 A | 11/2007 |

* cited by examiner

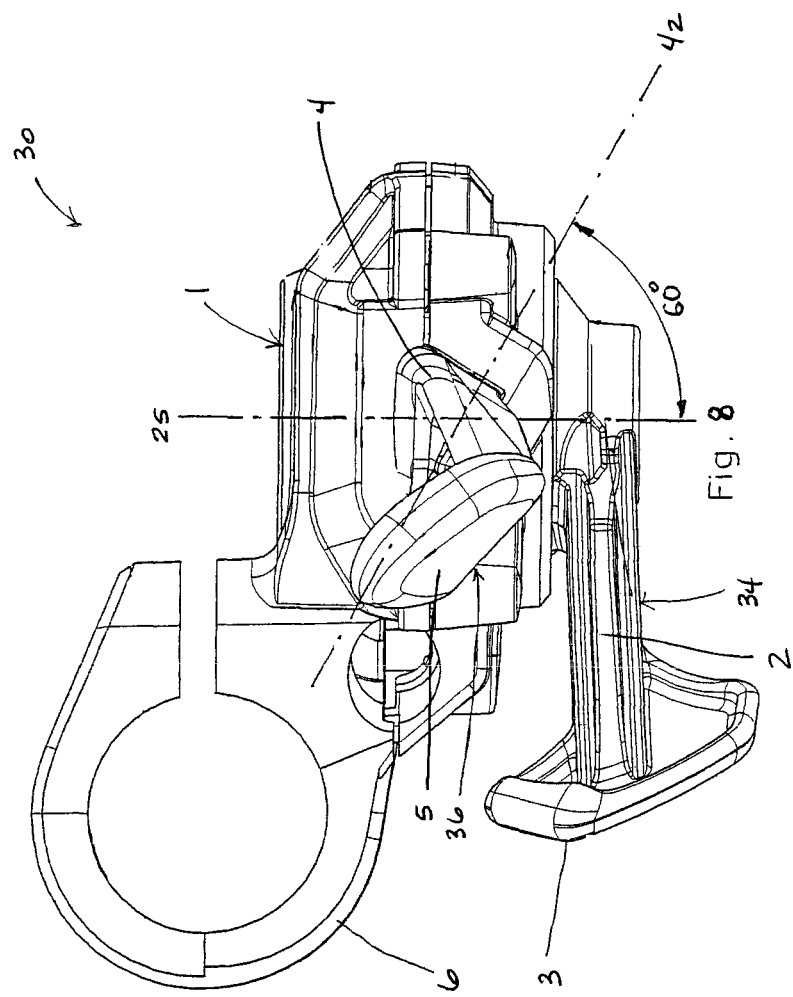

BICYCLE SHIFTER

BACKGROUND OF THE INVENTION

The present invention relates to bicycle shifters, and more particularly, to a bicycle shifter having a cable pull lever adjustable relative to a cable release lever and both levers adjustable relative to a handgrip element on a handlebar of the bicycle.

European Patent No. 1 270 396 A2 discloses a bicycle shifter for actuating a gear change device. The shifter is mounted to a handlebar adjacent a brake lever mechanism. A cable pull lever of the shifter is generally in an ergonomic position relative to a handgrip element on the handlebar. However, one disadvantage of this shifter is that lever reach is not adjustable for a variety of rider hand sizes. A fastener that secures the shifter to the handlebar only allows the shifter, and in turn the cable pull lever, to be adjusted along and about the handlebar. Accordingly, there is a need for a bicycle shifter that accommodates a variety of riders.

SUMMARY OF THE INVENTION

The present invention provides a bicycle shifter with adjustable lever reach to accommodate varying hand sizes of individual riders. The bicycle shifter generally includes a shifter housing, a cable spool for pulling and releasing a control cable connected to a gear change device, cable pull and release lever mechanisms, and a clamp for mounting the shifter to the handlebar of the bicycle. The cable spool rotates about an axis. The cable release lever mechanism rotates the cable spool in a cable-release direction and includes a cable release lever. The cable pull lever mechanism rotates the cable spool in a cable-pull direction and includes a cable pull lever. Preferably, the cable pull lever is rotatable about the cable spool axis, the swept motion of the cable pull lever defining a first plane of motion substantially perpendicular to the cable spool axis. The cable release lever is rotatable about a cable release lever axis, the swept motion of the cable release lever defining a second plane of motion substantially perpendicular to the cable release lever axis. Preferably, the first and second planes of motion form an angle of approximately 60 degrees. The cable pull and release levers include contact surfaces configured to be operated by the thumb. The contact surface of the cable pull lever is shaped and sized differently than the contact surface of the cable release lever. The contact surface of the cable pull lever preferably faces toward a rearward direction, opposite the forward riding direction and is disposed behind the cable release lever. The contact surface of the cable release lever is preferably partially inclined to allow the thumb to slip along the inclined contact surface when the rider moves his thumb in the forward riding direction. Further, the lever contact surfaces are oriented and positioned such that when the rider grips a handgrip element on the handlebar, the rider's thumb readily reaches the contact surfaces.

The cable pull lever is attachable to a driver element that is operatively connected to the cable spool. The cable pull lever is preferably attachable to a cylindrical outer surface of the driver element. In one embodiment, the cable pull lever includes a first clamping arm and a second clamping arm, the clamping arms including bores aligned to receive a tension screw. The driver element preferably includes an annular groove formed in its cylindrical outer surface to help secure the clamping arms to the driver element, the clamping arms attachable to the driver element at various orientations with the tension screw. Accordingly, the orientation of cable pull lever may be adjusted relative to the cable release lever and to a handgrip element on the handlebar.

The shifter housing includes a base having a longitudinal guide for receiving the clamp. The longitudinal guide is arranged parallel to the handgrip element and includes at least two bores spaced from each other. The clamp is mounted to the guide at one of the bores by a fastener. The position of the pull and cable release levers relative to the handgrip element is determined by which bore the clamp is mounted to and the position of the shifter on the handlebar. When the shifter is mounted between the brake lever mechanism and the handgrip element, the clamp is mounted to the housing at the bore closest to the handgrip element. When shifter is mounted inboard of the brake lever mechanism and the handgrip element, the clamp is mounted to the housing at the bore farthest from the handgrip element, positioning the contact surfaces of the levers closer to the handgrip element. The present invention provides a shifter having cable pull and release levers that are adjustable to be ergonomically operable regardless of the layout of the braking mechanism.

These and other features and advantages of the present invention will be more fully understood from the following description of one or more embodiments of the invention, taken together with the accompanying drawings.

BRIEF DESCRIPTION OF THE DRAWINGS

In the drawings:

FIG. 8 is a side view of the bicycle shifter.

DETAILED DESCRIPTION

Figure 1:
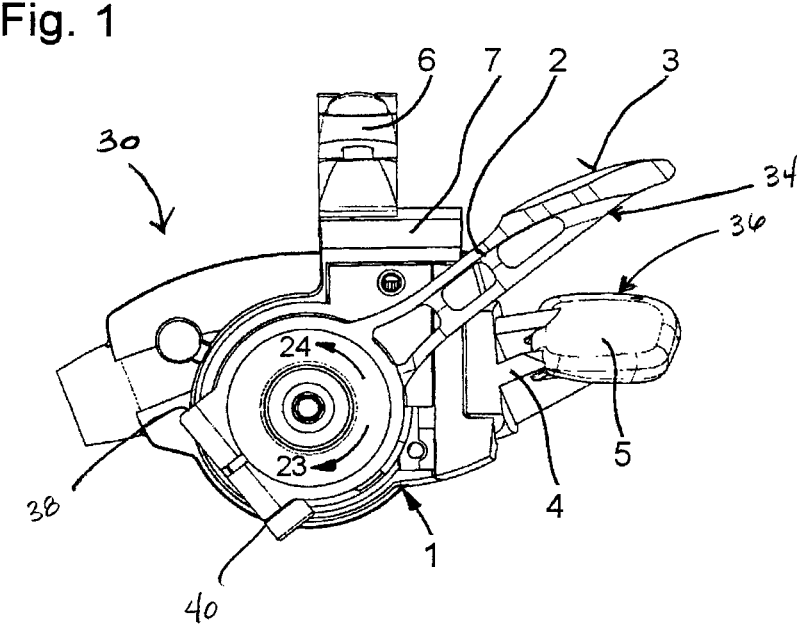
FIG. 1 is a bottom view of a bicycle shifter in accordance with one embodiment of the present invention.
Figure 2:
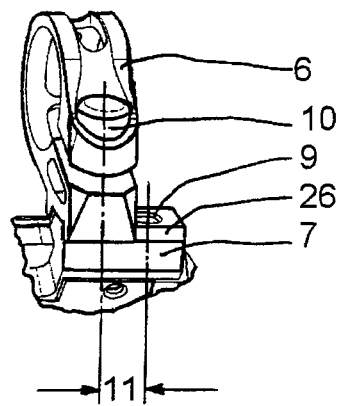
FIG. 2 is a partial view of the bicycle shifter of FIG. 1 showing a clamp connected to a shifter housing.
Figure 3:
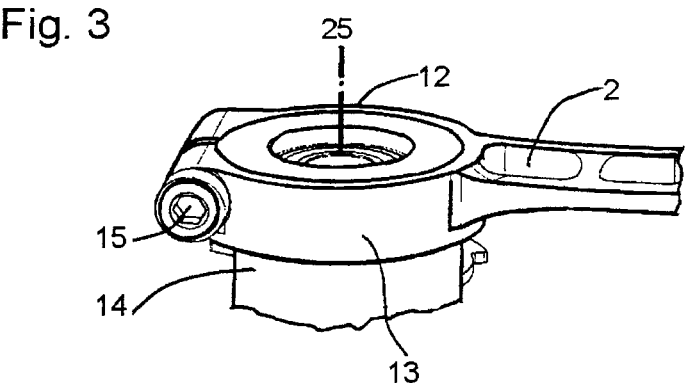
FIG. 3 is a partial view of a cable pull lever connected to a driver element of the bicycle shifter of FIG. 1.
Figure 4:
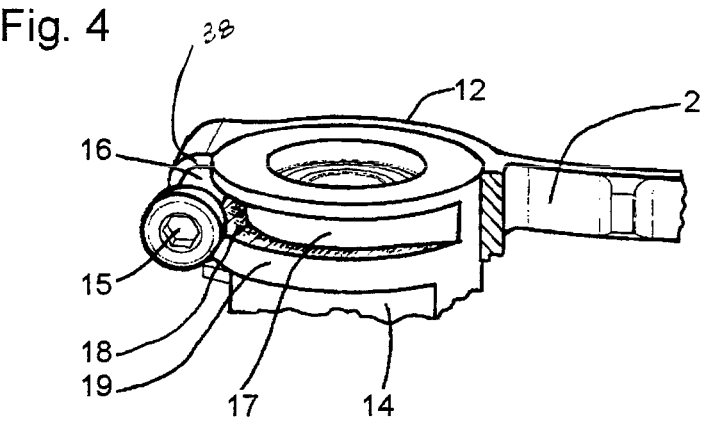
FIG. 4 is a partial view of the driver element and one side of the cable pull lever of the bicycle shifter of FIG. 1.
Figure 5:
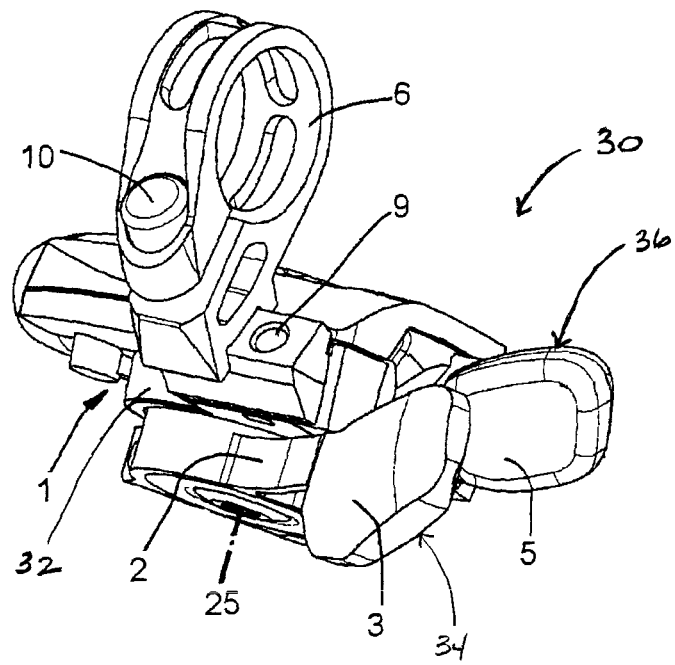
FIG. 5 is a perspective view of the bicycle shifter of FIG. 1.
Figure 6:
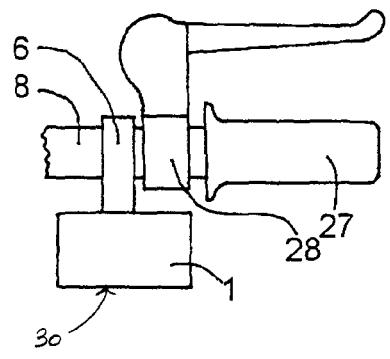
FIG. 6 is a side view of the bicycle shifter mounted on a handlebar inboard of a brake lever mechanism and a handgrip element.
Figure 7:
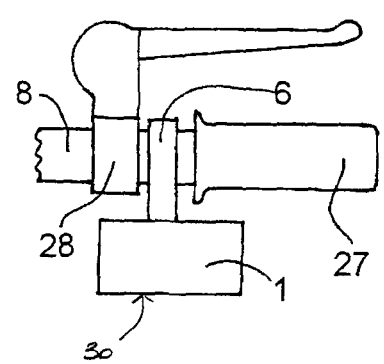
FIG. 7 is a side view of the bicycle shifter mounted on the handlebar between the brake lever mechanism and the handgrip element.

FIGS. 1-8 illustrate a bicycle shifter 30 according to one embodiment of the present invention. The shifter 30 generally includes a shifter housing 1, a cable spool 32, cable pull and release lever mechanisms 34, 36 and a clamp 6 for mounting the shifter 30 to a handlebar 8 of the bicycle. The cable spool 32 is rotatable about an axis 25 and has a cable groove for receiving a control cable. The cable groove may include a seat for securing an end of the control cable. The other end of the control cable is connected to a gear change device (not shown). The cable pull lever mechanism 34 rotates the cable spool 32 in the cable-pull or winding direction 23 to shift gears in a first direction, and the cable release lever mechanism 36 rotates the cable spool 32 in the cable-release or unwinding direction 24 to shift gears in a second direction.

Looking to FIG. 8, preferably, the cable pull lever mechanism 34 includes a cable pull lever 2 rotatable about the axis 25, the swept motion of the cable pull lever 2 defining a first plane of motion substantially perpendicular to the axis 25. The cable release lever mechanism 36 includes a cable release lever 4 rotatable about a cable release lever axis 42, the swept motion of the cable release lever 4 defining a second plane of motion substantially perpendicular to the cable release lever axis. Preferably, the cable release lever axis 42 extends adjacent to the cable pull lever axis 25 and is tilted partially upward and partially forward in the riding direction. Preferably, the cable pull and cable release lever axes 25, 42 form an angle of approximately 60 degrees therebetween.

The cable pull and release levers 2, 4 are preferably disposed below the handlebar 8 and include contact surfaces 3, 5 configured to be conveniently operated by the thumb. The cable release lever 4 is offset about one thumb width forward of the cable pull lever 2 in the riding direction and above the cable pull lever 2. The contact surface 3 of the cable pull lever 2 is shaped and sized differently than the contact surface 5 of the cable release lever 4. The contact surface 3 of the cable pull lever 2 is convex, whereas the contact surface 5 of the cable release lever 4 is concave and inclined from the direction of thumb motion to allow the thumb to deliberately slip off the contact surface 5 resulting in a rapid shifting operation. Actuation of the cable release lever 4 includes a motion component in the forward or riding direction, and a motion component in the upward or vertical direction. Actuation of the cable pull lever 2 is substantially in the forward or riding direction.

The cable pull lever mechanism 34 further includes a driver element 14 operatively connected to the cable spool 32. The driver element 14 preferably includes an annular groove 17 having two walls 18. The cable pull lever 2 includes first and second clamping arms 12, 13 attachable about a cylindrical outer surface 19 of the driver element 14. The clamping arms 12, 13 have bores 38, 40 aligned for receiving a tension screw 15 to clamp the arms 12, 13 together. A shaft 16 of the tension screw 15 is preferably received in the annular groove 17 between the two walls 18, resulting in a frictional engagement between the cable pull lever 2 and the driver element 14. The position of the cable pull lever 2 relative to the cable release lever 4 is determined by the orientation of the cable pull lever when clamped to the driver element 14. The cable pull lever 2 is adjustably attachable to the driving element 14 within an angular range of at least 120 degrees.

The shifter housing 1 includes a base 7 having a longitudinal guide 26 for receiving the clamp 6. The longitudinal guide 26 is arranged parallel to the handgrip element 27 on the handlebar 8 and includes at least two bores 9 spaced from each other by a distance 11. The clamp 6 may be mounted to the guide 26 at one of the bores 9 by a fastener, in this embodiment a clamp screw 10. The position of the cable pull and release levers 2, 4 relative to the handgrip element 27 is determined by which bore 9 the clamp 6 is mounted to and by the positioning of the shifter 30 relative to the brake mechanism on the handlebar 8. When the shifter 30 is mounted between the brake lever mechanism 28 and the handgrip element 27, the clamp 6 is mounted to the housing 1 at the bore 9 closest to the handgrip element 27. When shifter 30 is mounted inboard of the brake lever mechanism 28 and the handgrip element 27, the clamp 6 is mounted to the housing 1 at the bore 9 farthest from the handgrip element 27, positioning the contact surfaces 3, 5 of the levers 2, 4 closer to the handgrip element 27.

The shifter 30 is attached to the handlebar 8 by first deciding whether the clamp 6 should be mounted on the handlebar 8 between the handgrip element 27 and the brake lever mechanism 28, or inboard of the handgrip element 27 and the brake lever mechanism 27. Next, the clamp 6 is fastened to the shifter housing 1 by screwing the clamp screw 10 into the bore 9 closest to the handgrip element 27 if the clamp 6 is mounted between the brake lever mechanism 28 and the handgrip element 27, or by screwing the screw 10 into the bore 9 farthest from the handgrip element 27 if the clamp 6 is mounted inboard of the handgrip element 27 and the brake lever mechanism 28. Then the clamp 6 and the shifter housing 1 are positioned on the handlebar 8. The brake lever mechanism 28 is positioned on the handlebar 8 before or after the shifter 30 depending on where the shifter 30 is located. Finally, the handgrip element 27 is positioned on the handlebar 8. Next, the cable pull lever 2 is loosely fastened on the driver element 14 by the tension screw 15 being screwed through the second bore 40 of the arm 13, through the groove 17 of the driver element 14 and into the first bore 38 of the arm 12. Then the rider, while sitting on the bicycle, views the position of the shifter housing 1 and the cable pull lever 2. If the rider is satisfied with their alignment, the clamp screw 10 is tightened to secure the housing 1 to the handlebar 8 and the tension screw 15 is tightened to secure the cable pull lever 2 to the driver element 14. The position of the shifter housing 1 or cable pull lever 2 may be adjusted by loosening and re-tightening the screw 10 or the tension screw 15.

While this invention has been described by reference to one or more preferred embodiments, it should be understood that numerous changes could be made without departing from the spirit and scope of the inventive concepts described. Accordingly, it is intended that the invention not be limited to the disclosed embodiments, but that it be afforded the full scope of protection permitted by the language of the following claims.

What is claimed is:

1. A shifter for operating a bicycle gear change device, the shifter mountable to a handlebar inboard of a handgrip element, the shifter comprising:
   a shifter housing;
   a cable spool for pulling and releasing a control cable connected to the gear change device;
   a cable pull lever mechanism for rotating the cable spool in a cable-pull direction;
   a cable release lever mechanism for rotating the cable spool in a cable-release direction; and
   a clamp for mounting the shifter housing to the handlebar, the clamp configured separately from the shifter housing, the clamp adjustably attachable to the shifter housing substantially parallel to the handlebar,
   the shifter alternatively mountable to the handlebar on either side of a brake lever mechanism,
   the brake lever mechanism including a brake clamp mountable to the handlebar, the clamp separate from the brake clamp,
   a base of the shifter housing having a longitudinal guide parallel to the handgrip element on the handlebar, the longitudinal guide includes at least one bore, the clamp mounted to the longitudinal guide by a fastener received in the at least one bore.

2. The shifter according to claim 1 wherein the pull and cable release levers include contact surfaces, the contact surface of the cable release lever having a plane of motion inclined at an angle approximately 60 degrees relative to a plane of motion of the contact surface of the cable pull lever.

3. The shifter according to claim 2 wherein the contact surface of the cable pull lever and the contact surface of the cable release lever are configured relative to each other such that the pull and cable release levers are alternatively operated by a thumb of a hand located on the handgrip element on the handlebar.

4. The shifter according to claim 1 wherein the shifter is configured to be alternatively mountable to the handlebar on either side of the brake clamp.

5. The shifter according to claim 1 wherein the longitudinal guide includes at least two bores, the bores spaced from each other, the clamp mounted to the longitudinal guide by the fastener received in one of the bores.

* * * * *